United States Patent [19]

Tribelsky et al.

[11] Patent Number: 5,460,426
[45] Date of Patent: Oct. 24, 1995

[54] COMBINATION CARRYING CASE AND FOLDING SEAT

[75] Inventors: Boaz Tribelsky, Los Angeles; Patrick E. Quaney, Fountain Valley, both of Calif.

[73] Assignee: Eric Hart, Tarzana, Calif.; a part interest

[21] Appl. No.: 161,121

[22] Filed: Dec. 2, 1993

[51] Int. Cl.⁶ .................................................. A47C 1/16
[52] U.S. Cl. .................. 297/17; 297/183.5; 297/378.1
[58] Field of Search .................................. 297/17, 183.1, 297/183.5, 378.1, 378.72, 380, 381

[56] References Cited

U.S. PATENT DOCUMENTS

| | | |
|---|---|---|
| D. 316,190 | 4/1991 | Sadan . |
| 2,570,571 | 10/1951 | Leeman . |
| 4,060,276 | 11/1977 | Lindsay . |
| 4,079,992 | 3/1978 | Thrift . |
| 4,375,901 | 3/1983 | MacDonald . |
| 4,394,047 | 7/1983 | Brenelle ........................ 297/378.1 X |
| 4,474,407 | 10/1984 | Nazar . |
| 4,659,142 | 4/1987 | Kuchinsky, Jr. . |
| 4,687,248 | 8/1987 | Ross . |
| 4,746,166 | 5/1988 | Sadan ........................ 297/17 |
| 4,890,882 | 1/1990 | Harrington . |
| 5,015,026 | 5/1991 | Mouri ........................ 297/378.1 X |
| 5,016,792 | 5/1991 | Jay . |
| 5,029,350 | 7/1991 | Edelson . |
| 5,190,344 | 3/1993 | Anderson et al. ........................ 297/17 |

Primary Examiner—Peter R. Brown
Attorney, Agent, or Firm—Cislo & Thomas

[57] ABSTRACT

An improved, combination carrying case and folding seat (10) that allows various items to be carried and upon arriving at an outdoor activity, the case can be converted to a seat that includes a backrest. The combination (10) consists of an elongated bottom enclosure (12), a first and second articulated section (14) and a pair of caps (16). The enclosure (12) has on its lower, outer surface a plurality of transverse ribs (12R,12S) that have a horizontal surface which allows the combination (10) to be maintained in an upright position. The enclosure (12), also includes a first side member (12F) and a second side member (12K) that have a first-disk protrusion bore (12G) and a second disk protrusion bore (12M) respectively as well as a seat/backrest stop rod (12T) longitudinally located across its inner surface (12D). Each of the articulated sections (14) have a first circular disk structure (14G) that includes a rod bore (14I) and a seat/backrest stop protrusion (14J, 14K) and a second circular disk structure (14M) that includes a threaded rod (14P). The disk structures (14G, 14M) are rotatably inserted into the first and second disk protrusion bores (12G,12M) respectively and are held in place by the pair of caps (16).

20 Claims, 4 Drawing Sheets

COMBINATION CARRYING CASE AND FOLDING SEAT

TECHNICAL FIELD

The invention pertains to the general field of carrying cases and portable seats and more particularly to an improved, portable carrying case and folding seat combination that features optimum structural integrity, carrying volume and ease of operation.

BACKGROUND ART

There are presently a myriad of designs for carrying cases and portable folding seats that are primarily used for outdoor activities such as picnics and beach outings. In the prior art, there is also discloses several designs for combination carrying case that can be converted to a portable seat that includes a back rest.

The combination devices generally function well when used as a carrying case but have limitations when converted to a seat and backrest. The limitation of the seat use lies primarily in not having sufficient structural integrity to withstand, for an extended time period, the stresses placed on the combination device when a human body is placed on the seat and reclined upon the backrest. If stress points on existing designs are reinforced with additional material, the utility of the case is compromised in that the added structural material adds weight and reduces the internal volume of the case. Thus, limiting the amount and type of article that can be carried with in the device.

A search of the prior art did not disclose any patents that read directly on the claims of the instant invention. However, the following U.S. patents are considered related.

| U.S. Pat. No. | INVENTOR | ISSUED |
|---|---|---|
| D316,190 | Sadan | 16 April 1991 |
| 746,166 | Sudan | 24 May 1988 |
| 3,817,574 | McNab | 18 June 1974 |
| 3,092,224 | O'Neil | 4 June 1963 |

The U.S. Pat. No. Des. 316,190 and U.S. Pat. No. 4,746, 166 to Sadan disclose a portable seat and carrying case assembly. The assembly consists of first and second side wall members that are hinged together to allow a rotatable closed case position and an open seat position. On the side of each side wall member is located a pair of outward, concentric circular bearing surfaces. The projecting bearing surface of one side matches the recessed bearing surface of the other side. When these two sides are coupled to each other, they form a hinged connection therebetween. A bottom member forms a part of and rotatably supports the two side wall members in their coupled position.

The U.S. Pat. No. 3,817,574 to McNab discloses a combined seating and container device. The device consists of two opposed side walls, end walls and a bottom wall. The top of each side wall opens so that two receptacles are provided. Beneath the bottom wall are extensions of the inner side walls which are interconnected outwardly by living hinges. In the carrying position, snap fasteners at the upper inner ends of the sidewalls are engaged to hold the two side walls together. These fasteners are easily pulled apart when the device is to be converted to the seating position. In the seating position, one of the sidewalls serves as the seat, while the other acts as the backrest.

The U.S. Pat. No. 3,092,224 to O'Neil discloses a combination beach bag and seat. The combination consists of first and second hollow structures each having a pair of spaced sidewalls that are joined by wall means extending therebetween. The sidewalls and wall means each have free edges which join to define the open mouth of the hollow structure. The structure sidewalls can be placed with the free edges so that the two structures coact to form a closed receptacle for carrying articles.

In summary, none of the prior art patents particularly disclosed a structure of transverse ribs having a horizontal bottom edge that allow the devices to be placed in an upright position. Additionally, the structural elements used in the instant invention to maintain the first and second articulated sections in an open or closed positions were not disclosed.

DISCLOSURE OF THE INVENTION

The improved, combination carrying case and folding seat is designed to be used in either a folded carrying position or an extended position that allows it to be used as a seat with a backrest. The combination is simply molded of a high-impact plastic and consists of five elements: an elongated bottom enclosure, a first and second articulated section and two caps.

The elongated bottom enclosure functions as the base and joining structure for the first and second articulated sections. The enclosure has on its outer, bottom surface a plurality of transverse ribs that have a flat horizontal surface. This flat surface allows the combination carrying case and folding seat to be placed in an upright position which facilities the storage of the combination and prevents spillage of unopened liquid containers. On the inner surface of the enclosure is a longitudinally located seat stop rod that functions in combination with a seat-stop protrusion located on the first and second articulated sections. This combination provides a positive structural stop that allows the seatrest to firmly remain at an obtuse angle when the combination is rotated into the sitting configuration.

The first and second articulated sections are identical and are shaped with triangular sides that are attached to a curved base section. The articulated sections are designed to provide sufficient volume to allow various picnic and beach articles to be stored and carried. On the lower sides of each articulated section is located a first and second circular disk structure that rotatably interface with a corresponding first and second-disk protrusion bore. The seat-stop protrusion as described above is located on the bottom surface of the first circular disk structure of each articulated section.

When the two articulated section are inserted into the respective first and second protrusion bores on the elongated bottom enclosure they are held together by attaching a cap at each end. The caps are threaded into a threaded rod that extends from each second circular disk structure. When the caps are tightened, the selected position of the combination carrying case and folding seat is maintained.

In view of the above disclosure, it is the primary object of the invention to provide a combination carrying case and folding seat that is easily converted from a storage, carrying configuration to a sitting configuration.

In addition to the primary object, it is also an object of the invention to produce a combination carrying case and folding seat that;

1. is designed with sufficient structural integrity to preclude a collapse problem when a person is seated.
2. has sufficient space to carry three 12-ounce (355 mL) beverage cans end-to-end and a variety of articles normally taken to picnics and beach outings.
3. is constructed of a durable high-impact plastic which allows all elements to be injection molded and in a variety of colors.
4. is designed to be placed in an upright position to facilitate storage, article accessibility and to prevent spillage of containers stored therein.
5. includes a combination seat stop rod and seat stop protrusion that maintains the combination is an extended sitting position.
6. is cost effective from both a manufacturing and consumer's point of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

The best mode for carrying out the improved, combination carrying case and folding seat 10 is shown in FIGS. 1 through 9 and is comprised of the following major elements: an elongated bottom enclosure 12, a first and second articulated section 14 that function as first and second side wall members, and a first and second cap 16. All elements are preferably made of a high impact plastic and are injection molded.

The elongated bottom enclosure 12 serves as the bottom member and primary support for the carrying case portion of the combination 10. The enclosure, as shown best in FIGS. 1 and 2, consists of a curved bottom trough 12A that has a first end 12B, a second end 12C, an inner surface 12D and an outer surface 12E. Extending upwardly from the first end 12B of the trough 12A as best shown in FIG. 2, is a first side member 12F and from the second end 12C extends upwardly a second side member 12K. Both the first and second side members are integrally formed with the curved bottom trough 12A and have a substantially 90-degree triangular shape, with sides that extend downward and outward from the apex of the triangular shape.

Figure 3:
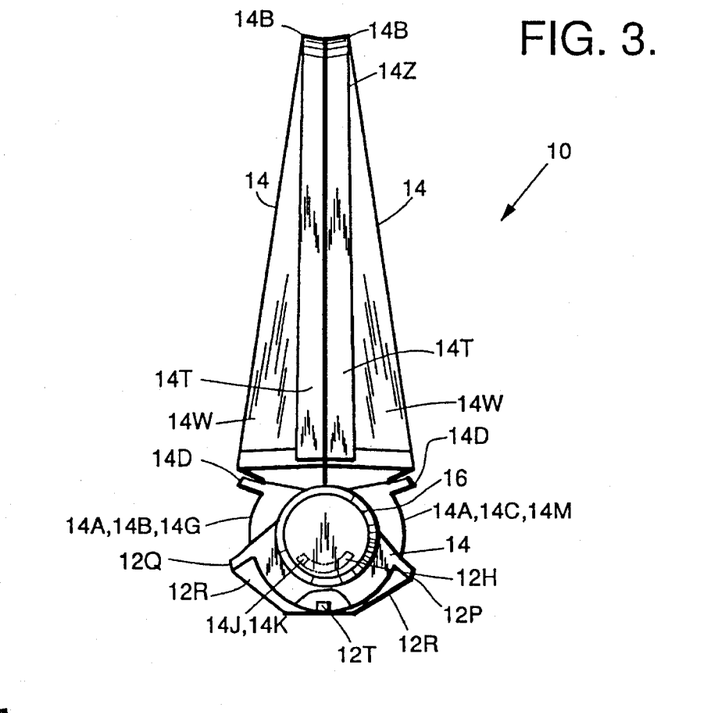
FIG. 3 is a side elevational view of the combination shown in the closed carrying configuration, the figure includes a cutaway section showing the location of seat/backrest stop rod.
Figure 4:
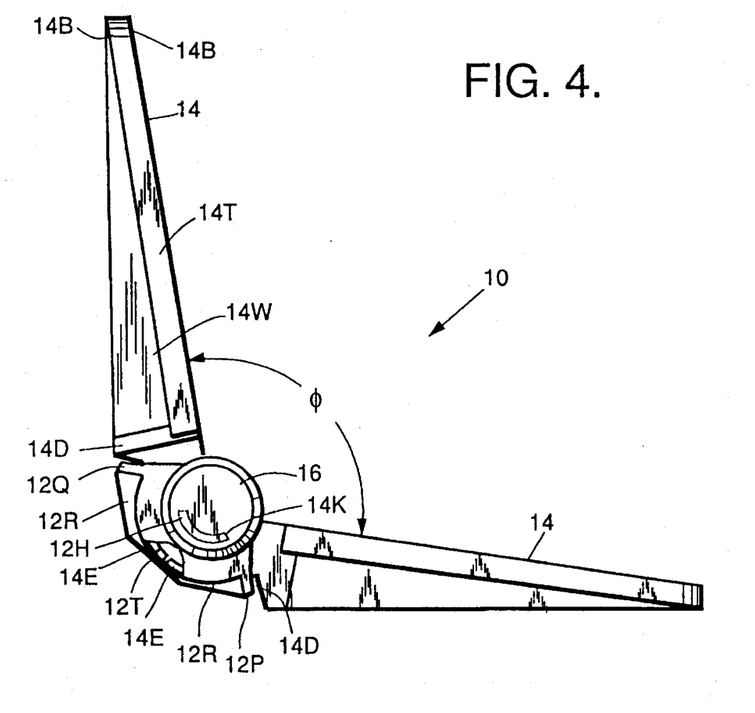
FIG. 4 is a side elevational view of the combination showing in the opened, sitting position, the figure includes a cutaway section showing the interface between the bottom edges of the first and second articulated sections with the seat/backrest stop rod.
Figure 5:
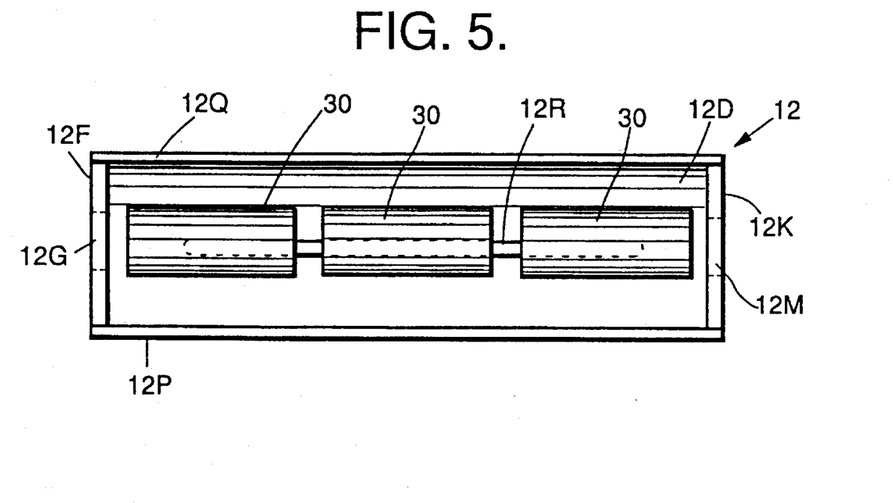
FIG. 5 is a top plan view of the elongated bottom enclosure showing the placement of three beverage cans end-to-end.

The first side member 12F has therethrough a centered first-disk protrusion bore 12G and a curved first stop-slot 12H. The slot 12H as best shown in FIGS. 3 and 4 is located below and off-center from the first-disk protrusion bore 12G and substantially follows the curved contour of the bottom trough 12A. Likewise, the second side member 12K has therethrough a centered second-disk protrusion bore 12M and a curved second stop-slot 12N that is also located below and off-center from the second-disk protrusion bore 12M. The inclusion of the integrally formed first and second side members encloses the curved bottom trough 12A to form the elongated bottom enclosure 12. The enclosure 12 is sized to accommodate three 12-ounce (355 mL) beverage cans 30 placed end-to-end as shown in FIG. 5.

Figure 6:
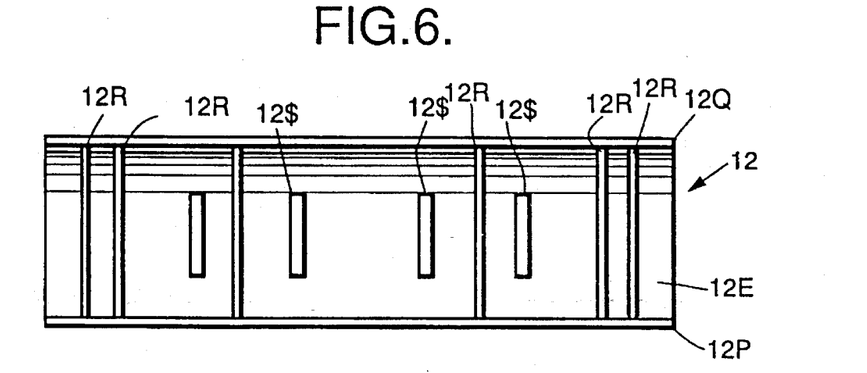
FIG. 6 is a bottom plan view of the elongated bottom enclosure showing the placement of the primary and secondary transverse ribs.

One of the novel features of the invention is that the combination carrying case and folding seat 10 can be placed and stabilized in an upright position. This feature allows articles stored in the carrying case such as non-sealed liquid container to remain upright and also facilitates the storage of the unit. To provide this feature, a front edge protrusion 12P and a back edge protrusion 12Q are employed that extend longitudinally across the first and second side members 12F,12K as best shown in FIGS. 2 and 3. The protrusions form the upper edge of a plurality of primary transverse ribs 12R as shown in FIG. 6, that extend downward from the outer surface 12E of the elongated bottom enclosure 12 with their bottom edges as shown in FIG. 3, lying in a horizontal plane. Interposed between the two centered primary transverse ribs are a plurality of smaller secondary transverse ribs 12S as also shown in FIG. 6, that are centrally and horizontally located on the outer surface 12E of the enclosure 12. The ribs 12R and 12S provide the horizontal platform that allows the placement of the combination 10 in the upright position. The elongated bottom enclosure also includes a small seat/backrest stop rod 12T. The rod is centrally located and extends longitudinally along the inner surface 12D of the curved bottom trough 12A as shown in FIGS. 2 and 3. The rod forms an element of the structure that is used to maintain the seat and backrest of the folding seat in an upright, sitting position as described infra.

Figure 1:
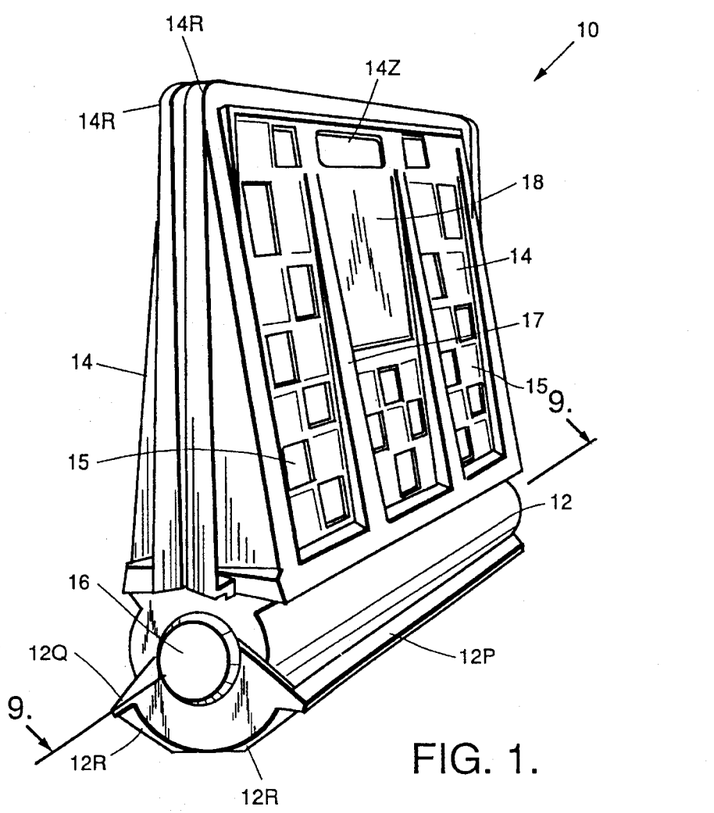
FIG. 1 is a perspective view showing the improved, combination carrying case and folding seat in a folded, carrying position.
Figure 2:
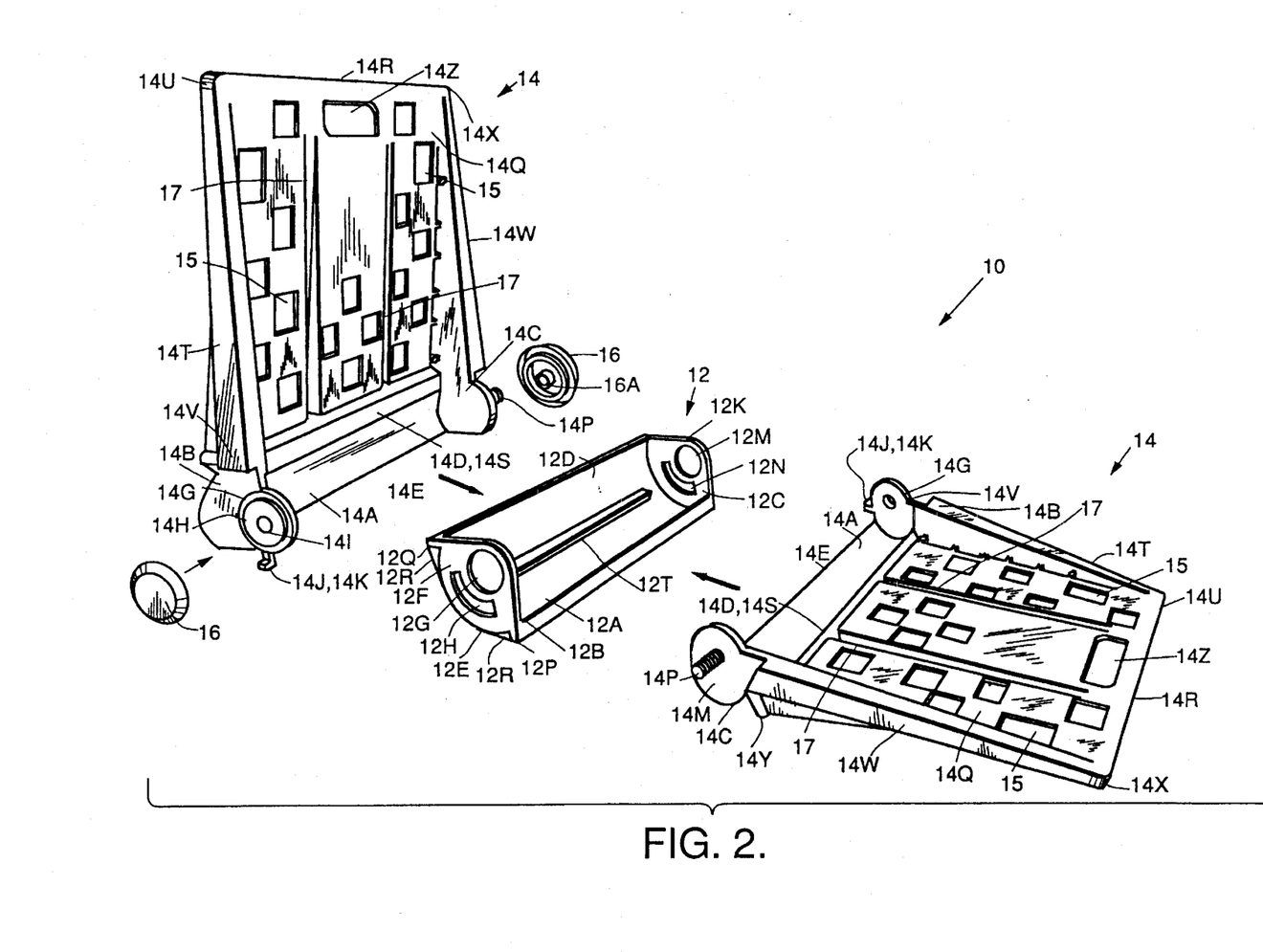
FIG. 2 is an exploded view showing the relative positions of the elongated bottom enclosure, the first and second articulated sections and the two caps

The seat and backrest as well as the enclosing structure for the carrying case portion of the invention 10 is provided by the first and second articulated sections 14 as also shown in FIGS. 1 and 2. Both the first and second side wall members 14 are identical and consist of a curved base section 14A that has an opening that faces inward and where the curve substantially follows the inner contour of the curved bottom trough 12A of the elongated bottom enclosure 12. Each of the curved base sections which function as concentric circular bearing surfaces, include a first side 14B, a second side 14C, an upper edge 14D and a bottom edge 14E.

Figure 7:
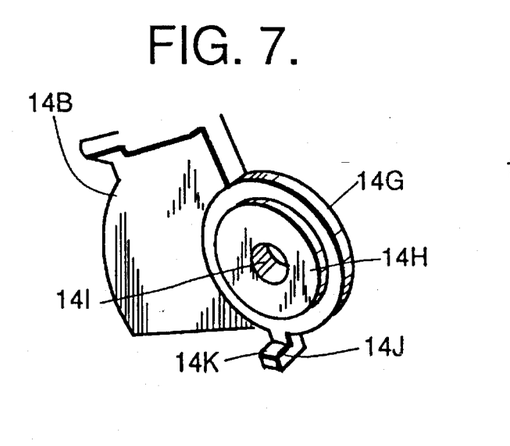
FIG. 7 is a perspective view of the first circular disk structure which comprises a part of the first and second articulated sections.
Figure 9:
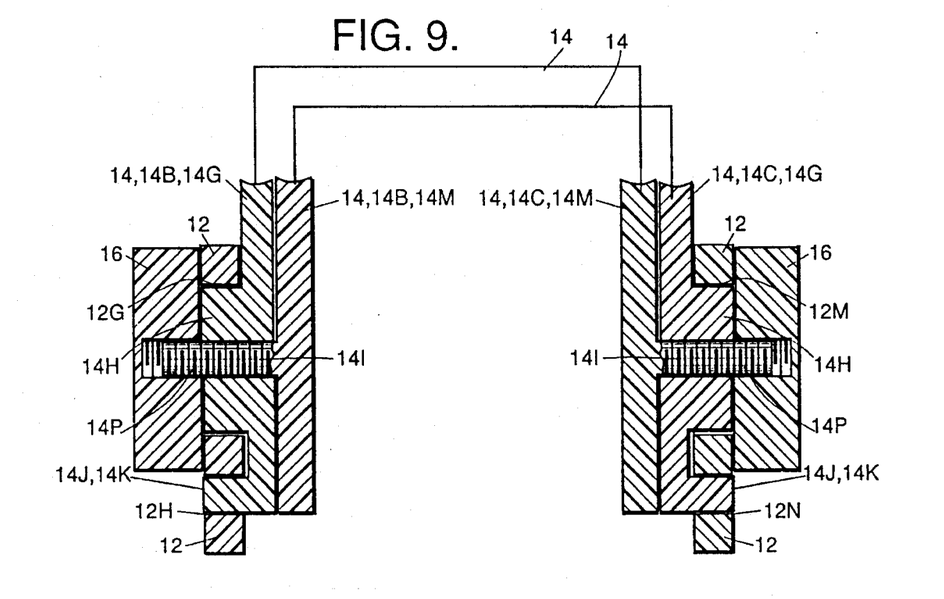
FIG. 9 is a sectional view taken along the lines 9—9 of FIG. 1 which shows the interfacing between the first circular disk structure, the second circular disk structure and the cap.

Extending inward from the first side 14B of the curved base section 14A is an integrally formed first circular disk structure 14G as best shown in FIGS. 7 and 9. The structure 14G includes a smaller concentric outer protrusion 14H that has therethrough a rod bore 14I and a downwardly extending vertical seat/backrest stop protrusion 14J. The protrusion has an extension 14K that extends outward 90-degrees from the vertical section and that slidably travels along the respective first stop-slot 12H and second stop-slot 12N located on the elongated bottom enclosure 12. The combination of the protrusion and extension 14J, 14K and the first and second stop-slots 12H, 12N comprise a pin and slot means. This means positively directs the bottom member 12 to be aligned with respect to the first and second side wall members 14 so as to form an aligned closure relative to the bottom member 12 and the first and second side wall members 14.

Figure 8:
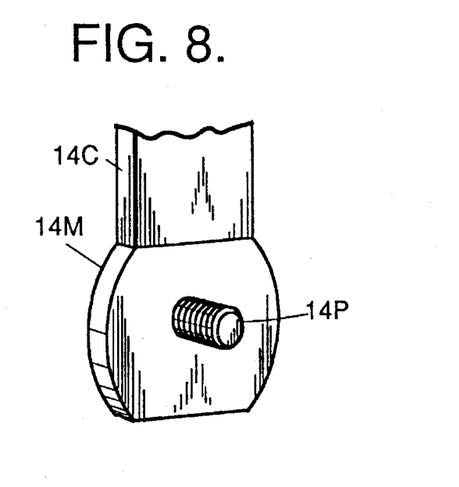
FIG. 8 is a perspective view of the second circular disk structure which comprises a part of the first and second articulated sections.

Extending inward from the second side 14C of the curved base section 14A is an integrally formed second circular disk structure 14M as best shown in FIGS. 8 and 9. The structure 14M has a centered threaded rod 14P that extends outwardly and that is in alignment with the rod bore 14I on the first circular disk structure 14G.

To complete the first and second articulated sections 14, a substantially square section 14Q that includes an upper edge 14R, and a lower edge 14S that is integrally formed with the upper edge 14D of the curved base section 14A. The sides of the square section 14Q include a first triangular side 14T and a second triangular side 14W. The first side 14T has an upper edge 14U and a lower edge 14V that extends further inward than the upper edge 14U to form a triangular shape as shown best in FIGS. 3 and 4. Likewise, the second triangular side 14W has an upper edge 14X and a lower edge 14Y that also extends further inward than the upper edge 14X to form a similar triangular shape. The triangular sides are sized so when the combination is closed and used as a carrying case, there is sufficient volume available to permit a variety of picnic or beach articles to be carried therein.

The square sections 14Q also include a handle opening 14Z having a rectangular shape as shown in FIGS. 1 and 2. When the two sections 14Q are closed, the two handle openings interface to form a carrying handle that maintains the two sections in a closed carrying position. As shown in FIGS. 1 and 2, the first and second articulated section 14 preferably include a multiplicity of staggered openings 15 therethrough that function to provide ventilation and add aesthetics. As best shown in FIG. 1, the sections 14 are also preferably molded with two equally spaced longitudinal ribs 17 that divide and reinforce the sections 14 into three equally spaced partitions. The center partitions as also beet shown in FIG. 1 includes an upper portion 18 that is free of openings 15 to allow selectable indicia to be placed therein.

The final elements that comprises the combination 10 are a first cap 16 and a second cap 16. Both caps are identical with each cap having a threaded cavity 16A. The first cap is threaded into the threaded rod 14P projecting through the first-disk protrusion bore 12G located on the elongated bottom enclosure 14 and the second cap is threaded into the threaded rod 14P projecting through the second-disk protrusion bore 12M on the enclosure 14.

To assemble and operate the combination carrying case and folding seat 10, the first concentric outer protrusion 14H located on the first side 14B of the first articulated section 14 as shown in FIG. 7, is inserted into the first disk protrusion bore 12G located on the elongated bottom enclosure 12. Afterwhich, the threaded rod 14P located on the first side 14B of the second articulated section 14 is inserted through the rod bore 14I on the first circular disk structure 14G. Likewise, the concentric outer protrusion 14H located on the second side 14C of the second articulated section 14 is inserted into the second-disk protrusion bore 12M on the elongated bottom enclosure 12. Afterwhich, the threaded rod bore 14P located on the second side 14C of the first articulated section 14 is inserted through the rod bore 14I on the second circular disk structure 14M. To hold the two sections 14 together, the cap 16 is threaded into the two extending threaded rods 14P.

When the two sections 14 are closed, that is, the upper edges 14R interface as shown in FIGS. 1 and 4, the combination 10 functions as an enclosed carrying case that is carried by means of the handle 14Z. When placed in the carrying case configuration, the two seat/backrest stop protrusions 14J and the 90-degree extension 14K are positioned at the end of the first and second stop slots 12H,12N as shown in FIG. 3. The stop slots limit the rotational travel of the articulated sections 14 so that the two sections 14 are correctly oriented in the vertical, carrying case position. When the two sections are to be placed in the seat and backrest configuration, the second or first articulated section 14 is rotated downwardly as shown in FIG. 4. When in the seat and backrest configuration, the bottom edges 14E on the first and second articulated sections 14 as shown in FIG. 4, interface with the seat/backrest stop rod 12T located on the inner surface 12D of the curved bottom trough 12A. Also, when in the seat and backrest configuration, the upper edges 14D of the first and second articulated sections interface with the respective front edge and back edge protrusions 12P,12Q on the elongated bottom enclosure as also shown in FIG. 4. The combined interfacings of the bottom edges 14E with the seat/backrest stop rod 12T and the upper edges 14P with the protrusions 12P,12Q allow the first and second articulated sections to be structurally maintained at an obtuse angle $\theta$ as shown in FIG. 4, to allow one of the sections 14 to function as a seat while the other as a backrest.

While the invention has been described in complete detail and pictorially shown in the accompanying drawings, it is not to be limited to such details, since many changes and modifications may be made in the invention without departing from the spirit and the scope thereof. Hence, it is described to cover any and all modifications and forms which may come within the language and scope of the appended claims.

We claim:

1. An improved, combination carrying case and folding seat, said combination comprising:

a) an elongated bottom enclosure having a curved bottom trough that has an outer surface, an inner surface that includes a centrally located and longitudinally extending seat/backrest stop rod, and a first side member and a second side member having triangular shapes and that enclose said elongated bottom enclosure, with the first side member having therethrough a centered first-disk protrusion bore and a curved first stop-slot that is located below and off-center from the first-disk protrusion bore and the second side member having therethrough a centered second-disk protrusion bore and a curved second stop-slot that is located below and off-center from the second-disk protrusion bore, where the two stop-slots substantially follow the curved contour of the bottom trough, b) a first articulated section and a second articulated section with each section comprising:

(1) a curved base section having an opening that faces inward and where the curve follows the inner contour of the curved bottom trough of said elongated bottom enclosure, with said curved base section having a first side, a second side, an upper edge and a bottom edge, (2) a first circular disk structure integrally formed inward from the first side of the curved base section, with the first circular disk structure having a smaller, concentric outer protrusion, a rod bore therethrough and a downwardly extending, vertical seat-stop protrusion having an end that extends 90-degrees from the vertical and that slidably travels along the respective first and second stop-slots on said elongated bottom enclosure, (3) a second circular disk structure integrally formed inward from the second side of the curved base section and having a centered threaded rod that extends outwardly and that is in alignment with the rod bore on the first circular disk structure, (4) a substantially square section having an upper edge, a lower edge integrally formed with the upper edge of the curved base section, a first triangular side having an upper edge and a lower edge, where the lower edge extends further inward than the upper edge to form the triangular shape, a second triangular side having an upper edge and a lower edge, where the lower edge also extends further inward than than the upper edge, whereupon when said first and second articulated sections are interfaced, the concentric outer protrusion of the first articulated section is inserted into the first-disk protrusion bore located on said elongated bottom enclosure, thereafter, the threaded rod on the second articulated section is inserted through the rod bore on the first circular disk structure, likewise, the concentric outer protrusion of the second articulated section is inserted into the second-disk protrusion bore in the said elongated bottom enclosure, thereafter, the threaded rod bore on the first articulated section is inserted through the rod bore on the second circular disk structure, where when said first and second articulated sections are to be placed in a seat and backrest configuration, the seat-stop protrusion on said first and second articulated sections interface with the seat-stop rod located on the inner surface of the curved bottom trough to allow said first and second articulated sections to be structurally maintained at an obtuse angle, and c) a first and second cap with each said cap having a threaded cavity, where said first cap is threaded into the threaded rod on said first circular disk structure and likewise said second cap is threaded into the threaded rod on said second circular disk structure, where said first and second caps function to selectively maintain said combination carrying case and folding seat in either a folded or unfolded configuration.

2. The combination as specified in claim 1 wherein the edges of the first and second side members of the elongated bottom enclosure extend beyond the ends of the curved bottom trough to form the upper end of a plurality of transverse ribs that extend downward from the outer surface of said elongated bottom enclosure with their bottom edges lying in a horizontal plane to allow said combination carrying case and folding seat to be placed and stabilized in an upright position.

3. The combination as specified in claim 1 wherein the triangular shape of the first and second side members of said elongated bottom enclosure are substantially at 90-degrees.

4. The combination as specified in claim 1 wherein the outer surface of said elongated bottom enclosure further comprises a plurality of structural transverse ribs.

5. The combination as specified in claim 1 wherein said bottom enclosure is sized to accommodate three 12-ounce (355 mL) beverage cans placed end-to-end.

6. The combination as specified in claim 1 wherein the square section further having a handle opening centrally located below the upper edge of the square section.

7. The combination as specified in claim 1 wherein each of said first and second articulated sections further having a multiplicity of staggered openings therethrough that function to provide ventilation and add aesthetics.

8. The combination as specified in claim 7 wherein each of said first and second articulated sections further comprise two equally spaced longitudinal ribs that divide and reinforce articulated sections into three equally spaced partitions.

9. The combination as specified in claim 8 wherein the center partition include an upper portion that is free from openings to allow indicia to be placed on the upper section.

10. The combination as specified in claim 1 wherein the triangular sides of each said first and second articulated sections are sized so that when operated as a carrying case, there is sufficient volume available to carry a variety of picnic and beach articles.

11. An improved, combination carrying case and folding seat, said combination comprising:

a) an elongated bottom enclosure further comprising:

(1) a curved bottom trough having a first end, a second end, an inner surface and an outer surface, (2) a first side member that extends upwardly from the first end of the bottom trough and having a substantially 90-degree triangular shape, with sides that extend downward and outward from the apex of the triangular shape, with the first side member further having therethrough a centered first-disk protrusion bore and a curved first stop-slot that is located below and off-center from the first-disk protrusion bore and that substantially follows the curved contour of the bottom trough, (3) a second side member that extends upwardly from the second end of the bottom trough and also having a substantially 90-degree triangular shape, with sides that extend outwardly from the apex of the triangular shape, with the second side member further having therethrough a centered second-disk protrusion bore and a curved second stop-slot that is located below and off-center from the second-disk protrusion bore and that substantially follows the curved contour of the curved bottom trough, where the inclusion of the first and second side member encloses the curved bottom trough to form said bottom enclosure, (4) a front and a back edge protrusion, where said protrusions are extensions of the first and second side members respectively and extend longitudinally across the first and second side members, where the front and back protrusions form the upper edge of a plurality of primary transverse ribs that extend downward along the outer surface of said elongated bottom enclosure and have a bottom section that lies in a horizontal plane to allow said combination carrying case and folding seat to be placed and stabilized in an upright position, (5) a plurality of secondary transverse ribs centrally and horizontally located on the outer surface of said elongated bottom enclosure and interposed between the primary transverse ribs, where the secondary ribs aid in stabilizing said combination carrying case and folding seat in the upright position, (6) a seat/backrest stop rod centrally located and longitudinally extending along the inner surface of the curved bottom trough, b) a first articulated section and a second articulated section with each said section being identical and comprising:

(1) a curved base section having an opening that faces inward and where the curve substantially follows the inner contour of the curved bottom trough of said elongated bottom enclosure, with said curved base section having a first side, a second side, an upper edge and a bottom edge, (2) a first circular disk structure integrally formed inward from the first side of the curved base section, with the first disk structure having a smaller, concentric outer protrusion, a rod bore therethrough and a downwardly extending, vertical seat/backrest stop protrusion having an end that extends 90-degrees from the vertical section that slidably travels along the respective first stop-slot and second stop-slot on said elongated bottom enclosure, (3) a second circular disk structure integrally formed inward from the second side of the curved base section, and having a centered threaded rod that extends outwardly and in alignment with the rod bore on the respective first circular disk structure, (4) a substantially square section having an upper edge, a lower edge integrally formed with the upper edge of the curved base section, a first triangular side having an upper edge and a lower edge, where the lower edge extends further inward than the upper edge to form the triangular shape, a second triangular side having an upper edge and a lower edge, where the lower edge also extends further inward than the upper edge, with the square section further having a handle opening centrally located below the upper edge, whereupon when said first and second articulated sections are interfaced, the first concentric outer protrusion located on the first side of the first articulated section is inserted into the first-disk protrusion bore located on said elongated bottom enclosure, after which, the threaded rod located on the first side of the second articulated section is inserted through the rod bore on the first circular disk structure, likewise, the concentric outer protrusion located on the second side of the second articulated section is inserted into the second-disk protrusion bore located on said elongated bottom enclosure, afterwhich, the threaded rod bore located on the second side of the first articulated section is inserted through the rod bore on the second circular disk structure, where when said first and second articulated sections are to be placed in a seat and backrest configuration, the first and second articulated sections are spread apart until the respective bottom edge on said first and second articulated sections interface with the seat/backrest stop rod located on the inner surface of the curved bottom trough and the upper edges of said first and second articulated sections interface with the respective front and back edge protrusions of said elongated bottom enclosure, where the interfacing elements allow said first and second articulated sections to be structurally maintained at an obtuse angle $\theta$, conversely, when said first and second articulated sections are placed in the carrying case configuration, the two seat/backrest stop protrusions and the 90-degree extensions are positioned at the end of the first and second stop slots, where the stop slots limit the rotational travel of the articulated sections so that the two sections are correctly positioned in the vertical, carrying case position, and c) a first cap and second cap with each said cap having a threaded cavity, where said first cap is threaded into the threaded rod projecting through the first-disk protrusion bore located on the elongated bottom enclosure and likewise said second cap is threaded into the threaded rod projecting through the second-disk protrusion bore on the elongated bottom enclosure, where said first and second caps function to selectively maintain said combination carrying case and folding seat in either a folded or unfolded configuration.

12. The combination as specified in claim 11 wherein said bottom enclosure is sized to accommodate three 12-ounce (355 mL) beverage cans placed end-to-end.

13. The combination as specified in claim 12 wherein each of said first and second articulated sections further comprise two equally spaced longitudinal ribs that divide and reinforce the articulated sections into three equally spaced partitions.

14. The combination as specified in claim 13 wherein the center partition include an upper portion that is free of openings to allow indicia to be placed therein.

15. The combination as specified in claim 11 wherein the handle openings on said first and second articulated sections have a rectangular shape and when interfaced function as a carrying handle that maintains the two sections in a closed position.

16. The combination as specified in claim 11 wherein each of said first and second articulated sections further having a multiplicity of staggered openings therethrough that function to provide ventilation and add aesthetics.

17. The combination as specified in claim 11 wherein the triangular sides of each said first and second articulated sections are sized so that when operated as a carrying case, there is sufficient volume available to permit a variety of picnic and beach articles to be carried.

18. An improved, combination carrying case and folding seat comprising first and second side wall members hinged to each other and rotatable between a closed, case-fashion position and an open, seat-fashion position, characterized in that the side wall members are identical, each comprising at each side thereof a pair of outwardly directed, concentric circular bearing surfaces, opposite ones of each of said bearing surfaces being formed with an outside and outwardly projecting and threaded projection and the opposite other sides matching the bearing surface of the other side of each of the side wall members by having a smaller, concentric outer protrusion, a projection bore therethrough and a downwardly extending vertical seat-stop protrusion, forming together when coupled to each other the hinged connection therebetween, and a bottom member forming part of and rotatably supporting the side wall members in their coupled position, the bottom member having oppositely opposed and curved stop-slots into which the seat-stop protrusions protrude, wherein the projection of the seat-stop protrusions into the stop-slots form a pin and slot means for positively directing said bottom member to be aligned with respect to said first and second side wall members so as to form an aligned closure relative to said bottom member and said first and second side wall members.

19. The improvement as specified in claim 18 wherein said bottom member is additionally formed with protuberances on a bottom surface thereof, so that said combined carrying case and folding seat may stand on end.

20. The improvement as specified in claim 19 wherein said bottom member is sufficiently large in both the lateral and axial planes to accommodate a plurality of beverage cans placed end-to-end to rest within said bottom member.

* * * * *